(12) United States Patent  
Hoyle

(10) Patent No.: US 6,963,891 B1
(45) Date of Patent: Nov. 8, 2005

(54) FAST FOURIER TRANSFORM

(75) Inventor: David J. Hoyle, Glendale, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/542,888

(22) Filed: Apr. 4, 2000

Related U.S. Application Data

(60) Provisional application No. 60/128,340, filed on Apr. 8, 1999.

(51) Int. Cl.[7] ............................................. G06F 15/00
(52) U.S. Cl. .................................................. 708/404
(58) Field of Search .............................. 708/403, 404, 708/405, 406, 407, 408, 409

(56) References Cited

U.S. PATENT DOCUMENTS

| | | | | |
|---|---|---|---|---|
| 4,612,626 A | * | 9/1986 | Marchant | 708/404 |
| 5,313,413 A | * | 5/1994 | Bhatia et al. | 708/408 |
| 5,430,667 A | * | 7/1995 | Takano | 708/404 |
| 5,491,652 A | * | 2/1996 | Luo et al. | 708/404 |
| 5,694,347 A | * | 12/1997 | Ireland | 708/404 |
| 5,890,098 A | * | 3/1999 | Kozaki et al. | 702/77 |
| 6,366,936 B1 | * | 4/2002 | Lee et al. | 623/1.11 |
| 6,591,284 B1 | * | 7/2003 | Brockmeyer et al. | 708/400 |

* cited by examiner

*Primary Examiner*—Chuong D Ngo
(74) *Attorney, Agent, or Firm*—Carlton H. Hoel; W. James Brady; Frederick J. Telecky, Jr.

(57) ABSTRACT

A fast Fourier transform with sequential memory accessing within each stage.

4 Claims, 11 Drawing Sheets

WHERE $n = 0, 1, \ldots, \frac{N}{4} - 1$

FAST FOURIER TRANSFORM

CROSS-REFERENCE TO RELATED APPLICATIONS

BACKGROUND OF THE INVENTION

The present invention relates to semiconductor devices, and in particular to devices and methods for fast Fourier transforms.

The terminology fast Fourier transform (FFT) refers to efficient methods for computation of discrete Fourier transforms (DFT). See generally, Burrus and Parks, DFT/FFT and Convolution Algorithms (Wiley-Interscience 1985), for a definition and discussion of various forms of the FFT. The commonly used FFT can be schematically represented as a series of elementary "butterfly" computations. In particular, FIG. 3 illustrates the computations of a four-stage 16-point (radix-2) FFT and represents the input data locations as the lefthand column of butterfly corners, the output data locations as the righthand column (which replace the input data in the same memory locations), and the (butterfly) computations as lines connecting the memory locations for the data involved together with the twiddle factors on the result lines. The overall computation proceeds as three nested loops: the outer loop counts through the four stages from left to right, the middle loop counts through a block of overlapping butterflies in a stage, and the inner loop jumps among the blocks of a stage as shown by the curved arrows. Each butterfly uses two complex data entries spaced apart by the stride with the spacing decreasing for each stage. Pseudocode for the FFT of FIG. 3 with PI an approximation for $\pi$, x[.] the initial data real parts, and y[.] the initial data imaginary parts is as follows:

```
stride = 16
do k = 1 to 4
    stride = stride/2
    do j = 0 to stride-1
        c = cos(2*PI*j/16)
        s = sin(2*PI*j/16)
        do i = j to 15 increment by 2*stride
            tempx = x[i] - x[i+stride]
            x[i] = x[i] + x[i+stride]
            tempy = y[i] - y[i+stride]
            y[i] = y[i] + y[i+stride]
            x[i+stride] = c*tempx - s*tempy
            y[i+stride] = s*tempx + c*tempy
        continue
    continue
continue
```

FIG. 3 indicates the order of computation of the butterflies in each stage by the curved arrows between the upper lefthand corners of the butterflies.

The FFT is widely used in real time digital signal processing requiring fast execution. However, typical computing systems have time consuming memory access, and the FFT is extremely memory access and storage intensive. Indeed, each butterfly (for radix-4) reads four complex data entries plus three complex twiddle coefficients from memory and writes four complex data entries back to the same data memory locations. Thus a 64-point radix-4 FFT requires a total of 192 data memory reads and 192 data memory writes and 144 memory reads for twiddle coefficients. Thus various approaches for efficient memory arrangement in FFTs have been proposed; such as the addressing system of U.S. Pat. No. 5,091,875.

However, in the known FFTs the jumping of the memory accesses (in the middle stages) typically results in cache thrashing and obliterates the advantages of cache memory as only one element in each cacheline is used and so reduces memory bandwidth. Thus the known FFTs have cache usage problems. And with the increasing availability of processors using packed data operations (single instruction multiple dispatch or SIMD), it is also important that the FFT be able to make effective use of these kinds of architectures.

SUMMARY OF THE INVENTION

The present invention provides an FFT method with an inner loop which sequentially progresses through memory to compute all the butterflies of a stage and thereby takes advantage of cache and all available SIMD processing bandwidth. Preferred embodiments also create a twiddle factor table with redundancy so the stage loop can sequentially progress through the table. Preferred embodiments include digital signal processors having data cache and programmed with the FFT method, and also include processors with SIMD architectures.

The invention has advantages including faster execution in systems with cache memory and SIMD instructions such as very wide load/store datapath and greater than two multipliers.

BRIEF DESCRIPTION OF THE DRAWINGS

The Figures are heuristic for clarity.

DESCRIPTION OF THE PREFERRED EMBODIMENTS

Overview

Figure 3:
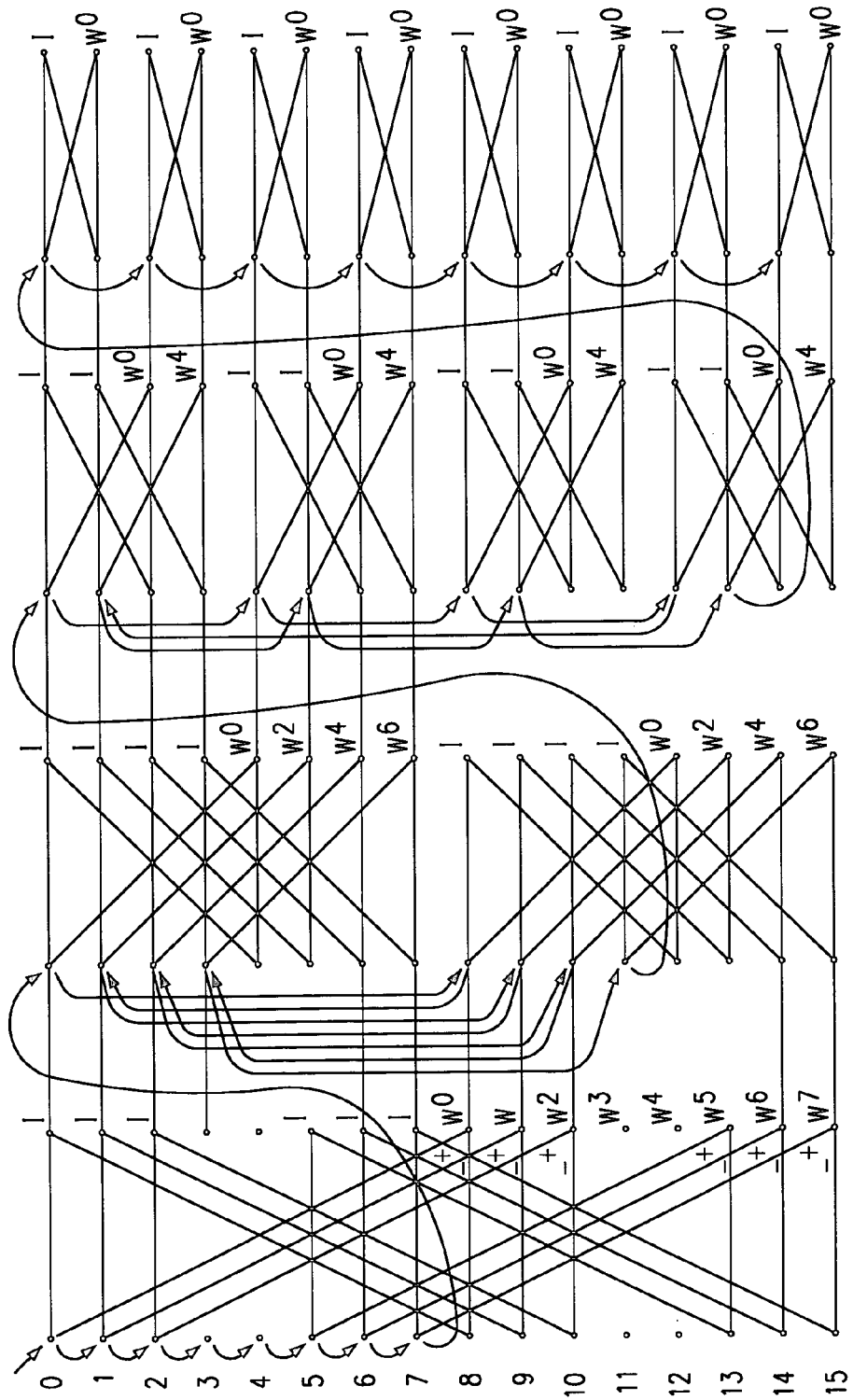
FIG. 3 shows a known FFT.

As illustrated by FIG. 3, the middle stage(s) of an FFT have disjoint blocks of overlapping butterflies. Indeed, prior art N-point (radix-R) FFTs for $N = R^M$ have three nested computation loops: (1) an outer loop (counting through the M stages), (2) a middle loop (counting through the number of butterflies within a block: from N/R in the first stage to 1 in the Mth stage); and (3) an inner loop (counting among the blocks of a stage: 1 block in the first stage and N/R in the Mth stage). The within-block loop size decreases from stage to stage by a factor of R, and the among-blocks loop size complementarily increases by a factor of R from stage to stage. The preferred embodiments (e.g., FIG. 1) essentially reorder the loops to avoid the jumps of the among-blocks inner loop and have (1) an outer loop counting the stages, (2) a middle among-blocks loop, and (3) a within-block inner loop. The last two loops may fuse to form a single constant size (N/R iterations) loop through the butterflies of a stage.

Figure 1:
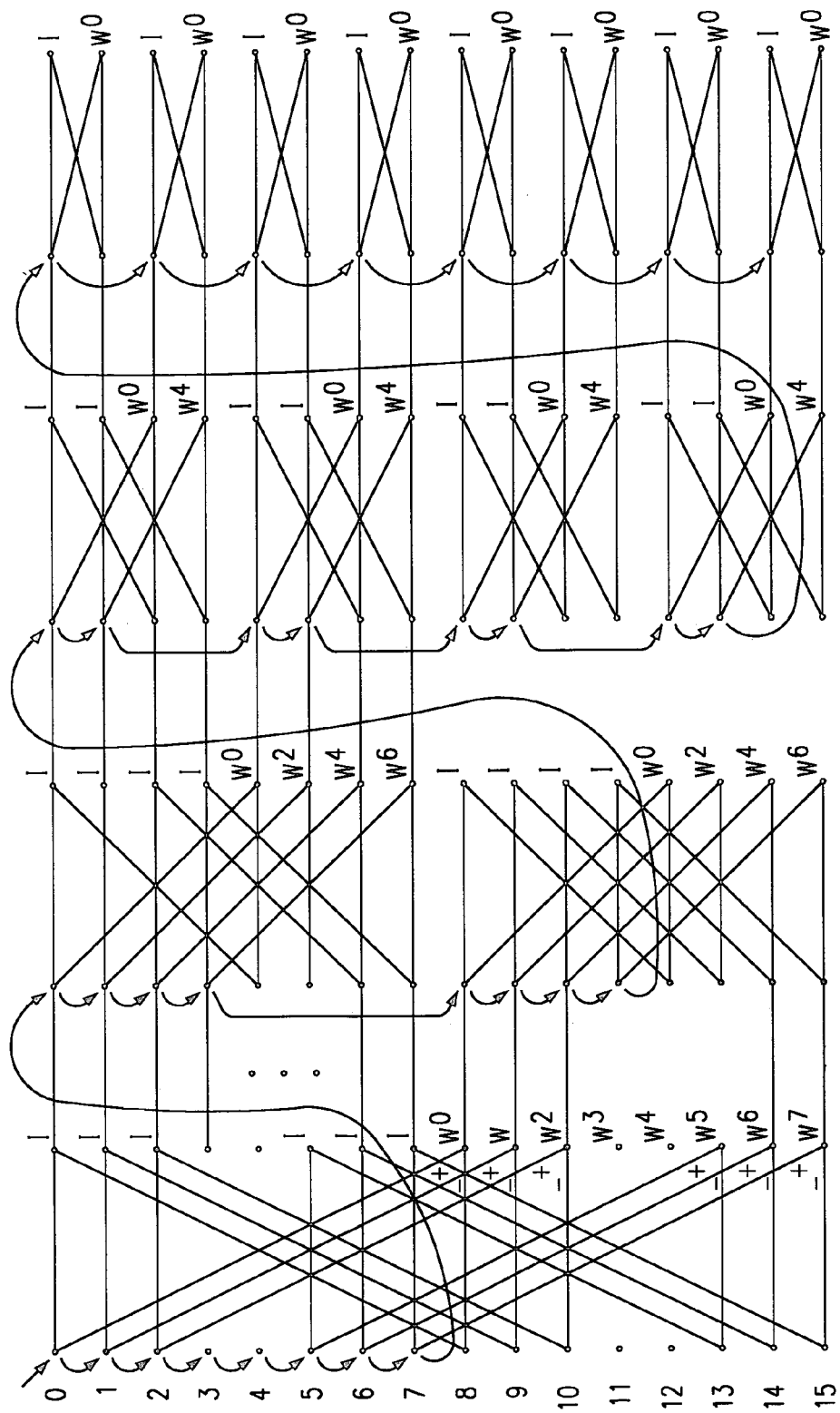
FIG. 1 illustrates a preferred embodiment FFT.

Compare preferred embodiment FIG. 1 and prior art FIG. 3 illustrating the ordering of the butterfly computations with the curved arrows.

As the inner loop always has N/R iterations in a deeply pipelined machine, the epilogue and prologue are constant and predictable. Not so in the prior art. Prior art progression through the loops causes the epilogue and prologue to become more and more of an overhead. This is reinforced as DSPs tend to be more deeply pipelined to achieve higher speeds, so loop prologue and epilogue is an architectural issue that must be overcome.

Radix-2 Preferred Embodiment

Figure 2:
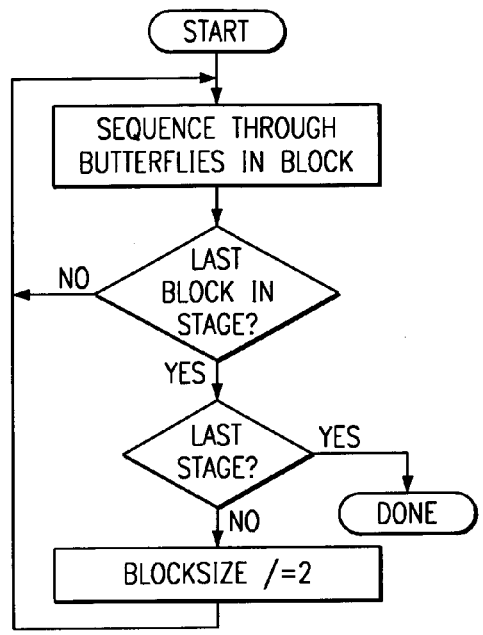
FIG. 2 is a flow diagram of a preferred embodiment.

FIG. 1 schematically illustrates a first preferred embodiment 16-point four-stage radix-2 FFT, and FIG. 2 the associated flow diagram. The loop structure generalizes beyond 16-point data to more practical situations, as will be described in the following section, but the 16-point embodiment will be used to demonstrate the general aspects of the embodiments. Pseudocode for the preferred embodiment is as follows (compare to pseudocode in the background):

```
stride = 16
n = 1
do k = 1 to 4
    stride = stride/2
    n = 2*n
    i = 0
    do j = 0 to 7
        m = n*(j%stride)
        c = cos(m*PI/16)
        s = sin(m*PI/16)
        tempx = x[i] - x[i+stride]
        x[i] = x[i] + x[i+stride]
        tempy = y[i] - y[i+stride]
        y[i] = y[i] + y[i+stride]
        x[i+stride] = c*tempx - s*tempy
        y[i+stride] = s*tempx + c*tempy
        i = i+1
        if((j+1)%stride == 0) i = i + stride
    continue
continue
```

Figure 11:
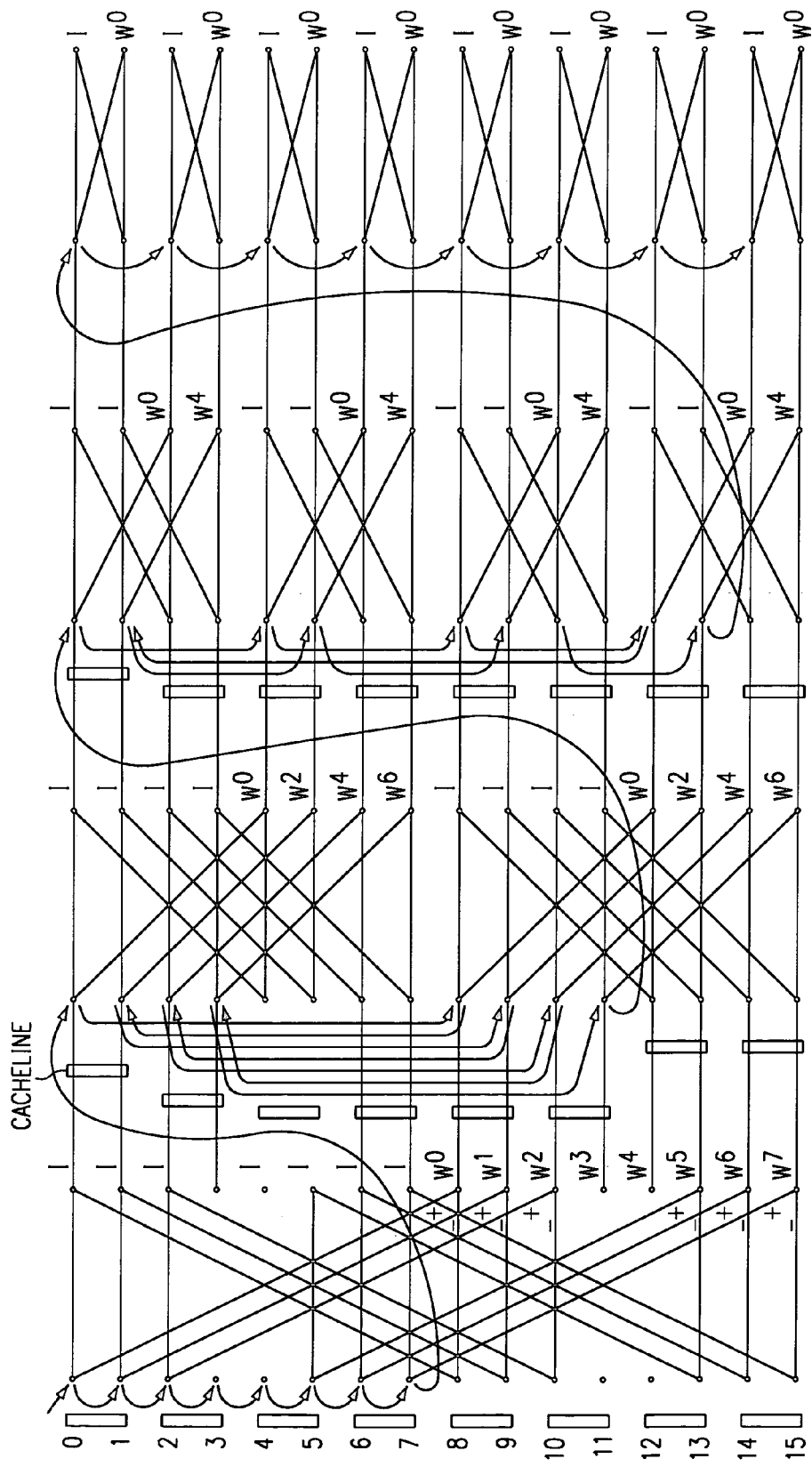
FIG. 11 illustrates cache thrashing.
Figure 12:
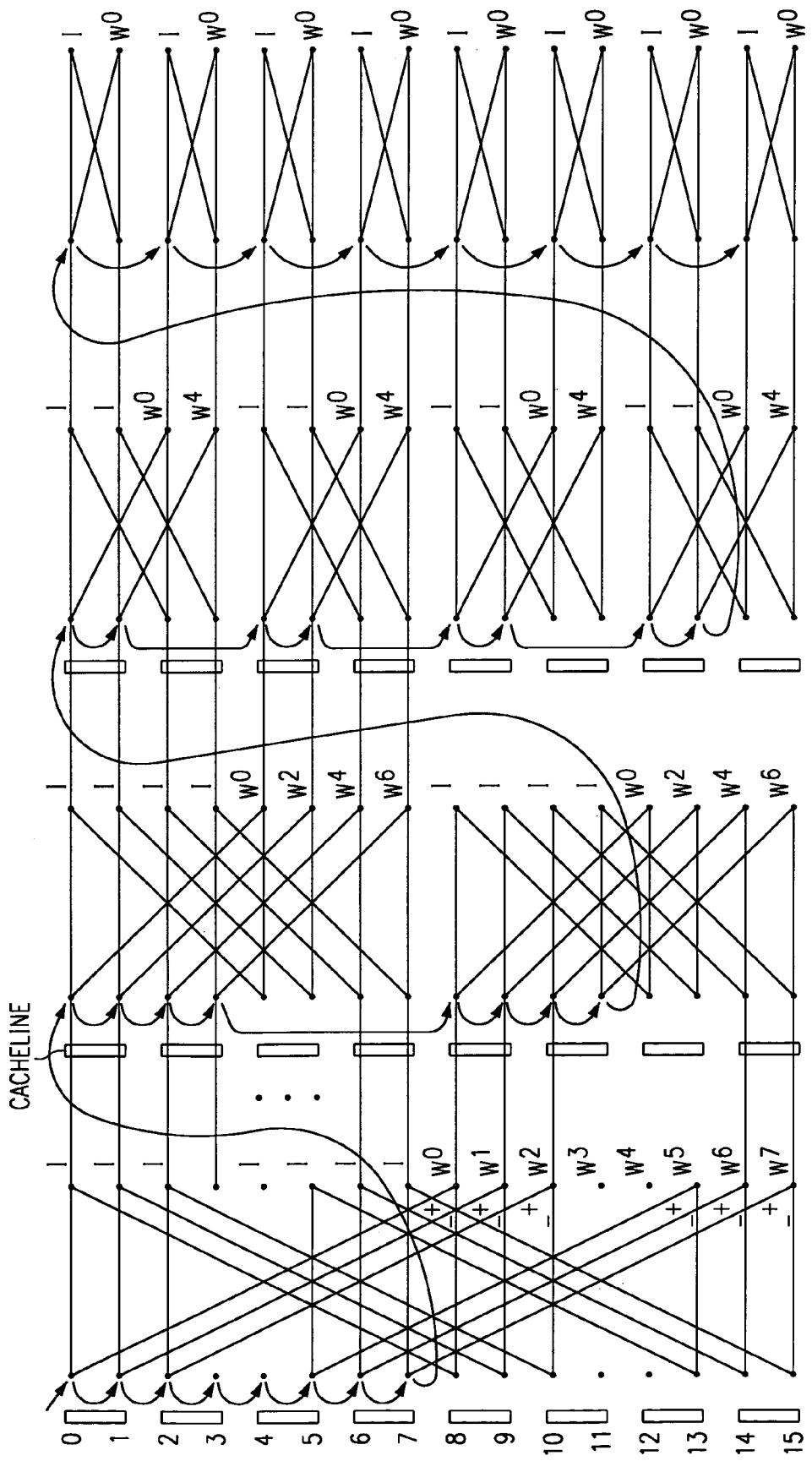
FIG. 12 shows cache utilization of a preferred embodiment.

The arrows in FIG. 1 indicate the order of computation of the butterflies in each stage and also the memory location jumps between blocks of overlapping butterflies. Comparison with FIG. 3 contrasts the essentially sequential memory location accessing of the preferred embodiment with the jumping back and forth accessing of the prior art in the middle stages. This sequential access implies effective use of cache memory for a processor employing the preferred embodiment. Indeed, if the cache line cannot hold all of the data of a stride, then the second butterfly in prior art FIG. 3 must access new cache lines; whereas the second butterfly data in preferred embodiment FIG. 1 will be adjacent the first butterfly data and likely in the same cache lines. Hence, once a cache line is accessed, it will be fully used up. Indeed, FIGS. 11 and 12 illustrate the prior art and preferred embodiment, respectively, with a cache line of 8 bytes (2 complex samples, each with 16-bit real and imaginary parts) indicated by the vertical rectangles. FIG. 11 showing how the prior art method will constantly cause eviction of good data and how each 8 byte line will only be 50% used. In contrast, FIG. 12 shows the preferred embodiment use of the whole cache line.

The computation of the twiddle factors in the foregoing pseudocode of both the preferred embodiment and the prior art could be avoided by precomputation and storage in a lookup table. But this implies another memory location sequence and cache usage question. Indeed, prior art FIG. 3 shows how the twiddle factors in the second stage skip the odd powers of W, and the twiddle factors of the third stage skip three out of four powers of W. The prior art sparsely accesses the twiddle factor table in a similar chaotic manner to how it accesses data.

Figure 9:
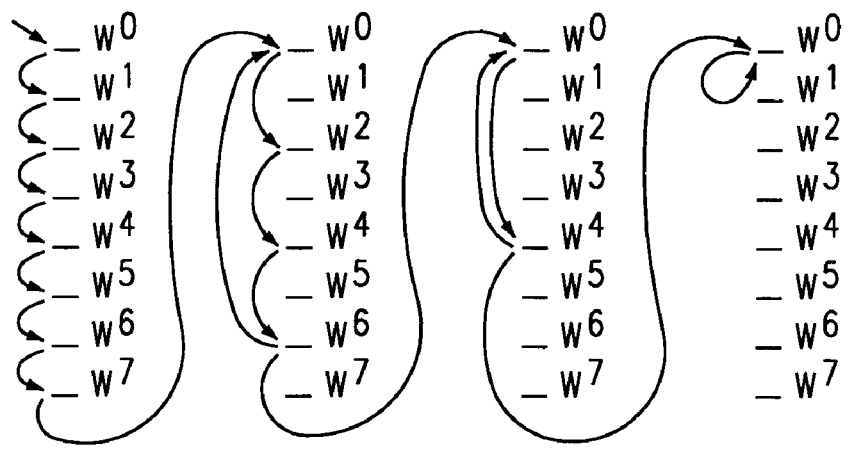
FIGS. 9–10 show twiddle factor table accesses.
Figure 10:
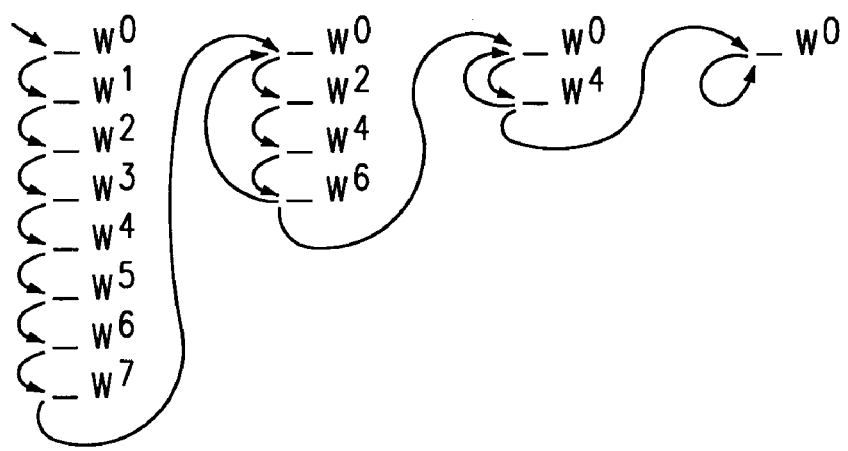

Some preferred embodiments employ a redundant twiddle factor table with sequential memory locations for butterfly computations in all stages. Indeed, FIG. 9 shows the prior art twiddle factor table accesses and FIG. 10 preferred embodiment accesses corresponding to the computations illustrated in FIGS. 3 and 1, respectively. The same table is used for each stage in FIG. 9; this implies the access jumps in the middle stages. In contrast, the preferred embodiment has a separate portion of a redundant twiddle factor table for each stage which yields the sequential accesses. Of course, $W^0=1$, so the last stage does not need any table lookups.

The following general radix-4 section includes generation of a redundant twiddle factor table.

Radix-4 FFT

Figure 4A:
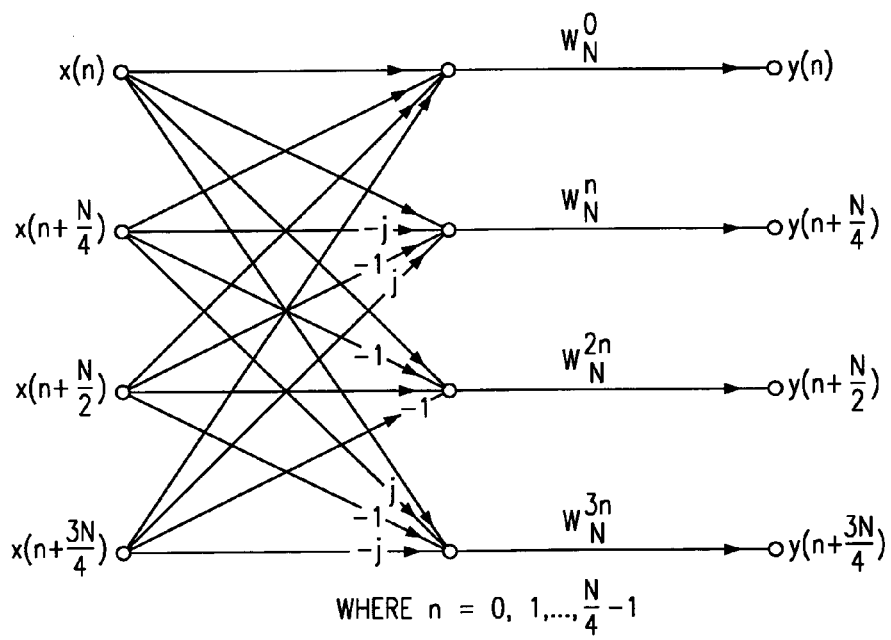
FIGS. 4a–4c illustrate a radix-4 butterfly plus an unrolled version.
Figure 4B:
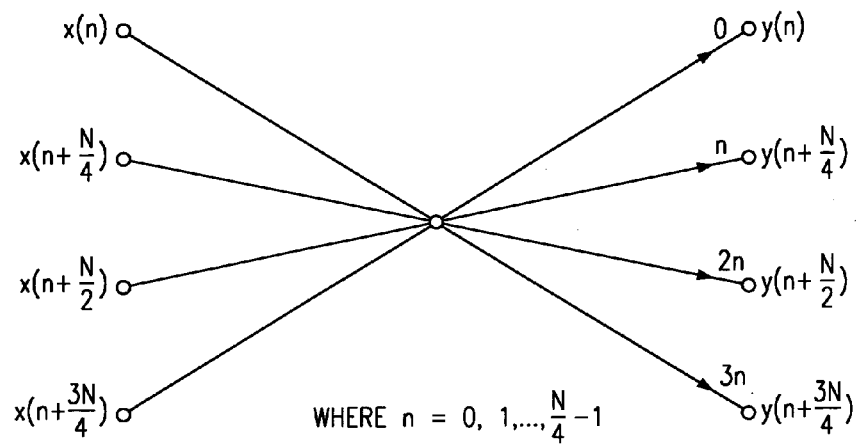
Figure 5:
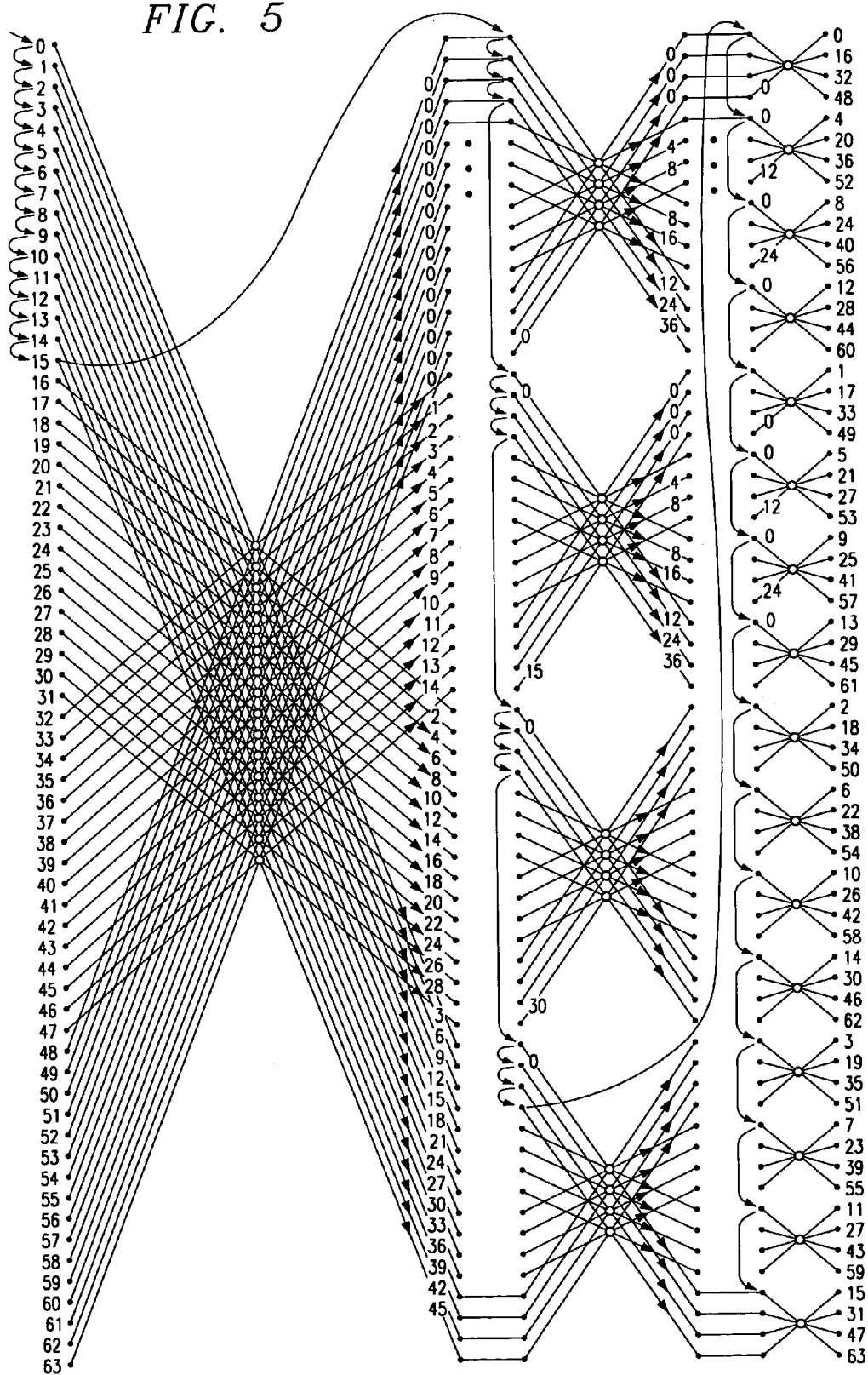
FIG. 5 shows a preferred embodiment radix-4 FFT.
Figure 6:
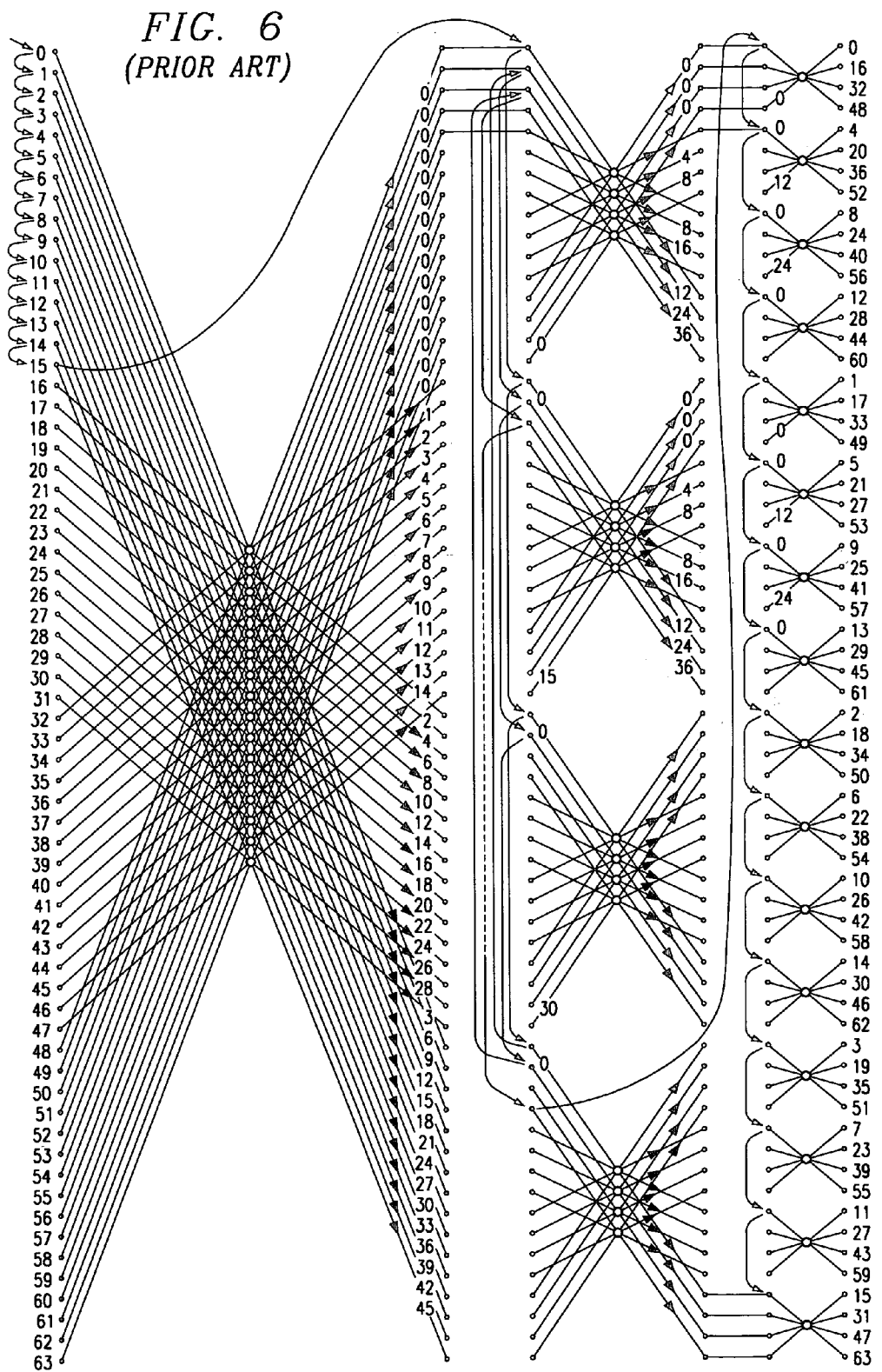
FIG. 6 is a known radix-4 FFT.

A radix-4 FFT has four-winged butterflies and twiddle factors as illustrated in FIG. 4a (FIG. 4b is an abbreviated version); and the middle stage butterflies again fall into disjoint groups of overlapping butterflies as shown in the three-stage radix-4 FFT of FIG. 5. FIG. 5 illustrates a preferred embodiment radix-4 FFT and FIG. 6 the prior art; again the preferred embodiment sequences through the butterflies of a block in the middle stage, whereas the prior art jumps from block to block.

A preferred embodiment FFT with a redundant twiddle factor lookup table can be described with the following code (written in C):

First, presume the input data consists of an array x of N (a power of 4) complex numbers, $x[0]+jx[1]$, $x[2]+jx[3], \ldots, x[i]+jx[i+1], \ldots$, with 16-bit real parts $x[0]$, $x[2], \ldots$ and 16-bit imaginary parts $x[1], x[3], \ldots$, and stored on word boundaries. Next, presume the twiddle factors, $1, W, W^2, \ldots, W^k \ldots$ with $W=e^{j2\pi/N}$, with 16-bit real and imaginary parts (cosines and sines), are redundantly generated and stored in array w follows whre PI is a 16-bit approximation of $\pi$ and theta1, theta2, theta3, x_t, and y_t are double precision floating point numbers for accuracy:

```
M = 0x8000;
For(j=1, k=0; j <= N>>2; j = j<<2)
{
    for(i=0; i < N>>2; i+=j)
    {
        theta1 = 2*PI*i/N;
        x_t = M*cos(theta1);
        y_t = M*sin(theta1);
        w[k] = (short) x_t;
        if(x_t >= M) w[k] = 0x7fff;
        w[k+1] = (short) y_t;
        if(y_t >= M) w[k+1] = 0x7fff;
        theta2 = 4*PI*i/N;
        x_t = M*cos(theta2);
        y_t = M*sin(theta2);
        w[k+2] = (short) x_t;
        if(x_t >= M) w[k+2] = 0x7fff;
        w[k+3] = (short) y_t;
        if(y_t >= M) w[k+3] = 0x7fff;
        theta3 = 6*PI*i/N;
        x_t = M*cos(theta3);
        y_t = M*sin(theta3);
        w[k+4] = (short) x_t;
        if(x_t >= M) w[k+4] = 0x7fff;
        w[k+5] = (short) y_t;
        if(y_t >= M) w[k+5] = 0x7fff;
```

-continued
```
        k+=6;
      }
   }
```

FIG. 4a shows the twiddle factors for the nth butterfly in the first stage form a group of four as $W^0$ (=1), $W^n$, $W^{2n}$, and $W^{3n}$, and the foregoing theta1, theta2, and theta3 correspond to the n, 2n, and 3n powers for n=i. Thus each butterfly has three nontrivial twiddle factors.

The first (j=1) loop generates the 3N/4 nontrivial twiddle factors for the N/4 butterflies of the first stage and stores them in w[0] to w[3N/4−1] in the order of use as indicated by FIG. 5 (FIG. 5 uses the abbreviated butterfly representation as in FIG. 4b rather than the FIG. 4a full version). In contrast, the second (j=4) loop generates the 3N/16 nontrivial twiddle factors for only a single block of butterflies of the second stage and stores them in w[3N/4] to w[3N/4+3N/16−1]; this is the order of use within a block as indicated by FIG. 5. The nth butterfly within each of the four blocks of the second stage uses the same group of four twiddle factors: 1, $W^{4n}$, $W^{8n}$, and $W^{12n}$; of course, $W^4$ is just the W for a block of one quarter the size of the original. These second stage twiddle factors form a subset of the twiddle factors stored for the j=1 loop, but the accessing of them would not be sequential, so the preferred embodiment employs this redundant storage to maintain the sequential memory access.

Similarly for subsequent loops: the block size and number of nontrivial twiddle factors to be generated and stored reduces by a factor of 4 for each stage. Thus the total number of twiddle factors stored is 3N/4+3N/16+3N/64+...+3=3N/4*(1+¼+1/16+...+4/N)≈3N/4*4/3=N. This compares to the prior art table of 3N/4 entries; so the preferred embodiment twiddle factor table is only 33% larger.

The following function performs the FFT and stores the results in the same locations as the initial data but with the usual digit-reversed address (for radix-4 a digit is 2 bits and for radix-2 a digit is 1 bit):

```
void fft4(int n, short ptr_x[], short ptr_w[]) {
int i, j, l1, l2, h2, predj;
int l1p1, l2p1, h2p1, tw_offset, stride, fft_jmp;
short xt0, yt0, xt1, yt1, xt2, yt2;
short si10, si20, si30, co10, co20, co30;
short xh0, xh1, xh20, xh21, xl0, xl1, xl20, xl21;
short x_0, x_1, x_l1, x_l1p1, x_h2, x_h2p1, x_l2, x_l2p1;
short *x, *w, *x2, *x0;
      stride = N;
      tw_offset = 0;
      while(stride > 1) {
         j = 0;
         fft_jmp = stride + (stride>>1);
         h2 = stride>>1;
         l1 = stride;
         l2 = stride + (stride>>1);
         x = prt_x;
         w = ptr_w + tw_offset;
         for(i = 0; i < N>>1; i += 2) {
            si10 = w[j]; j++;
            co10 = w[j]; j++;
            si20 = w[j]; j++;
            co20 = w[j]; j++;
            si30 = w[j]; j++;
            co30 = w[j]; j++;
            x_0 = x[0];
            x_1 = x[1];
            x_l1 = x[l1];
```

-continued
```
            x_l1p1 = x[l1+1];
            x_h2 = x[h2];
            x_h2p1 = x[h2+1];
            x_l2 = x[l2];
            x_l2p1 = x[l2+1];
            xh0 = x_0 + x_l1; xh1 = x_1 + x_l1p1;
            xl0 = x_0 − x_l1; x_l1 = x_1 − xl1p1;
            xh20 = x_h2 + x_l2; xh21 = x_h2p1 + x_l2p1;
            xl20 = x_h2 − x_l2; xl21 = x_h2p1 − x_l2p1;
            x0 = x;
            x0[0] = xh0 + xh20; x0[1] = xh1 + xh21;
            x2 = x;
            x += 2;
            predj = (j − fft_jmp);
            if(!predj) x += fft_jmp;
            if(!predj) j = 0;
            xt0 = xh20; yt0 = xh1 − xh212;
            xt1 = xl0 + xl21; yt2 = xl1 + xl21;
            xt2 = xl0 − xl21; yt1 = xl1 − xl20;
            x2[l1] = (si20*yt0+co20*xt0)>>15;
            x2[h2] = (si10*yt0+co10*xt1)>>15;
            x2[l2] = (si30*yt0+co30*xt2)>>15;
            l1p1 = l1+1;
            h2p1 = h2+1;
            l2p1 = l2+1;
            x2[l1p1] = (co20*yt0−si20*xt0)>>15;
            x2[h2p1] = (co10*yt0−si10*xt1)>>15;
            x2[l2p1] = (co30*yt0−si30*xt2)>>15;
         }
         tw_offset += fft_jmp;
         stride = stride>>2;
      }
}
```

Note that the foregoing C code is optimized for the standard compilers for the 320C6211 DSP manufactured by Texas Instruments.

Cache Usage

Figure 7:
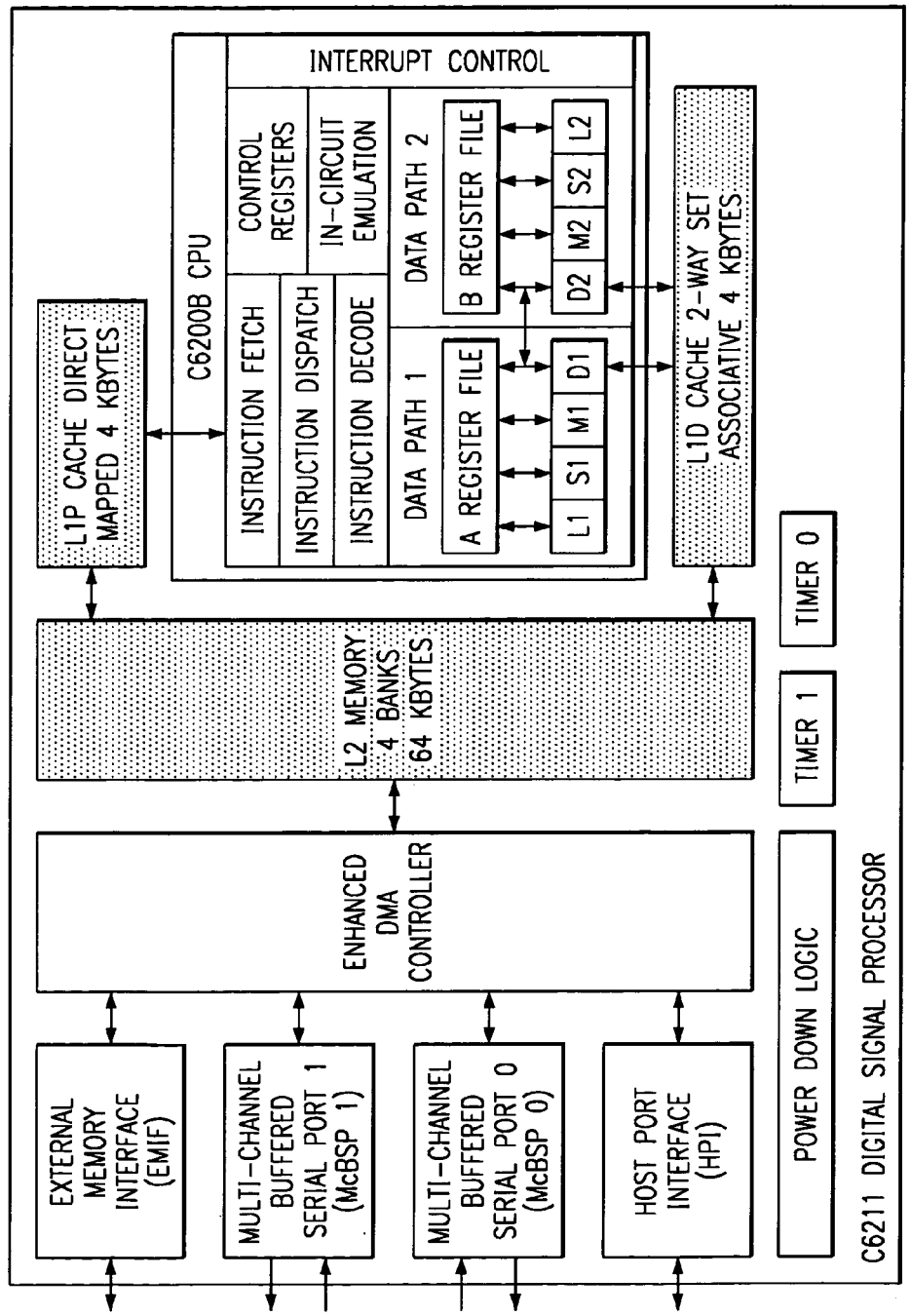
FIG. 7 illustrates a DSP with on-board cache.

FIG. 7 illustrates a 320C6211 DSP with 32 B cache lines for the first level 4 KB data cache. (The DSP also has a second level cache on-board.) Thus with 16-bit real and imaginary parts, 8 radix-4 butterflies can be computed with four cache lines for data and three cache lines for twiddle factors without the need to access level 2 cache or external memory; this implies increased speed compared to the prior art FFT. Indeed, the prior art FFT would refill the cache lines for data for each successive butterfly (except in the last stage in which two butterflies could be computed prior to refilling the cache lines for data and the first stage in which all accesses are linear); but the same twiddle factor is used for all butterflies computed by the inner loop.

SIMD Transformation

SIMD (single instruction multiple dispatch) transformations can be performed on algorithms where the data accesses form a linear pattern. For example, a convolution used in an FIR filter such as

```
    y[i] = 0
    for(j = 0 to n) {
       y[i] += x[i−j] * h[j]
    }
can be unrolled to form
    y[i] = 0
    for(j = 0 to n; j += 2) {
       y[i] += x[i−j] * h[j] + x[i−(j+1)] * h[j+1]
    }
```

Now the data pairs h[j], h[j+1] can be loaded as single data object; similarly the data pair x[i−j], x[i−(j+1)] can be loaded as a single data object. Then a complex multiplication operation (e.g., cmpy) can be used in the unrolled form:

$$y[i] += cmpy(x[i-(j+1)]:x[i-j], h[j]:h[j+1])$$

Figure 4C:
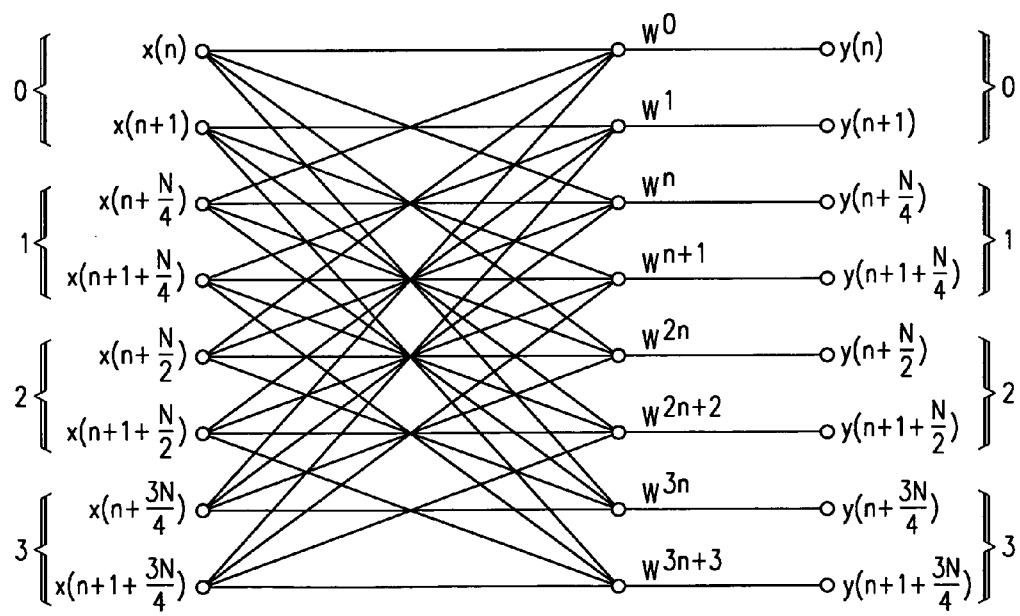
Figure 8:
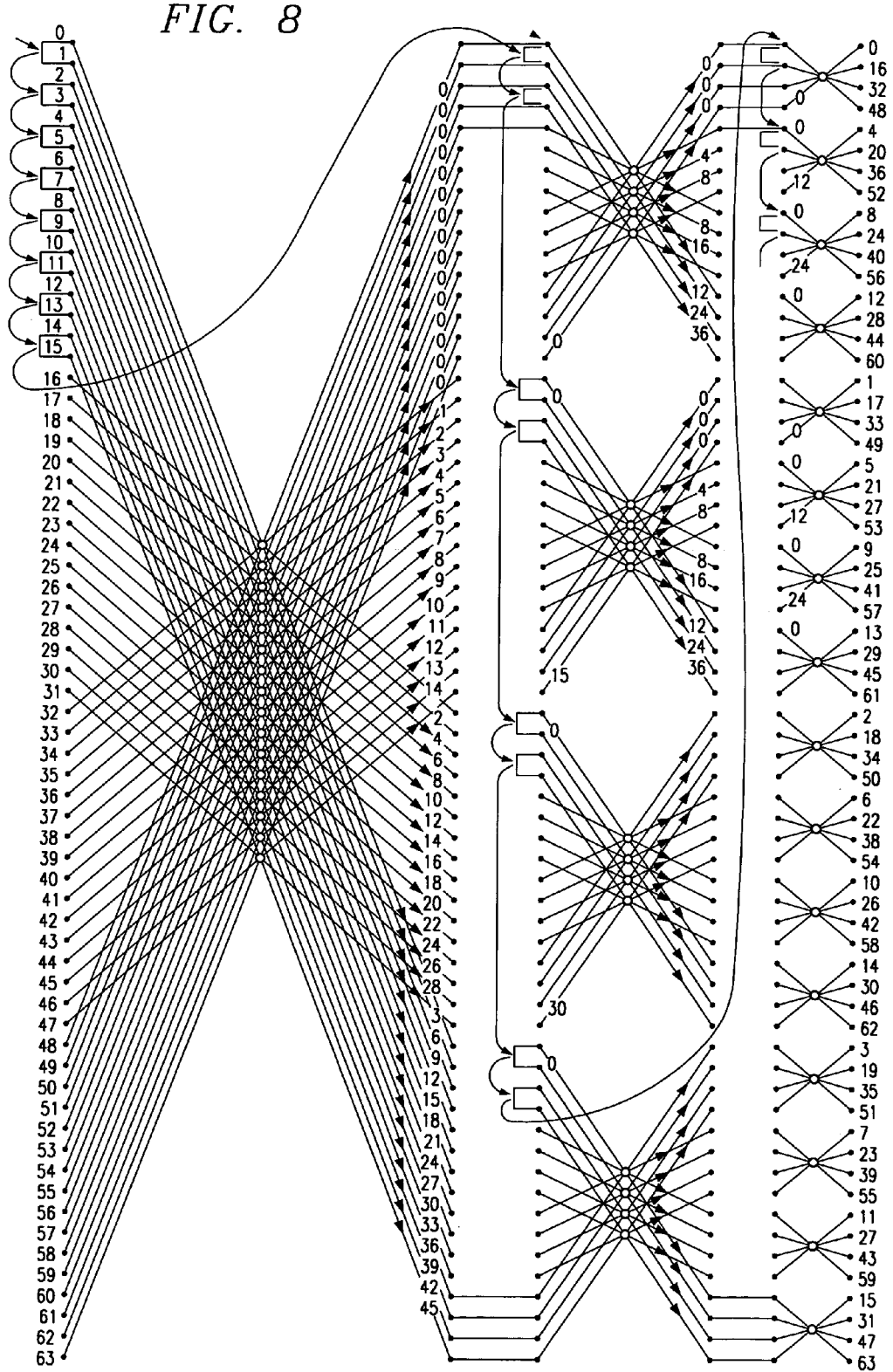
FIG. 8 shows a preferred embodiment parallelized radix-4 FFT.

The unrolled preferred embodiment can leverage such operations. The accesses are more FIR-like than FFT-like. In the prior art FFT the loops cannot be unrolled and merged together as the accesses jump about as illustrated for the middle stage in FIG. 6. The preferred embodiment loops can be unrolled and memory accesses merged to take advantage of wider memory interfaces such as LDDW of the TMS320C6701 DSP manufactured by Texas Instruments where 2 words are loaded at once. Also, more massively paralleled instructions such as paired multiplies and adds and subtracts can be leveraged and the FFT parallelized. See the unrolled butterfly illustrated in FIG. 4c. The exception is the last iteration when such butterfly blocks only access two pieces of data before jumping. But this last pass can be accommodated using a simple loop containing only adds and subtracts. FIG. 8 illustrates the pattern of accesses of pairs of data; the amount of unrolling can be varied to utilize more parallelism, up to the block size per stage. The following code implements the paired unrolling as in FIG. 8 with the last stage separately handled.

```
void fft4(int n, short ptr_x[], short ptr_w[]) {
int i, j, l1, l2, h2, predj;
int tw_offset, stride, fft_jmp;
short xt0, yt0, xt1, yt1, xt2, yt2;
short xt0_1, yt0_1, xt1_1, yt1_1, xt2_1, yt2_1;
short si10, si20, si30, co10, co20, co30;
short si11, si21, si31, co11, co21, co31;
short xh0, xh1, xh20, xh21, xl0, xl1, xl20, xl21;
short xh0_1, xh1_1, xh20_1, xh21_1, xl0_1, xl1_1, xl20_1, xl21_1;
short *x, *w, *x2, *x0;
stride = N; // N is the number of complex samples
tw_offset = 0;
while(stride > 4) { // do all but last stage
    j = 0;
    fft_jmp = stride + (stride>>1);
    h2 = stride>>1;
    l1 = stride;
    l2 = stride + (stride>>1);
    x = prt_x;
    w = ptr_w + tw_offset;
    for(i = 0; i < N>>1; i += 4) {
        si10 = w[j];
        co10 = w[j+1];
        si20 = w[j+2];
        co20 = w[j+3];
        si30 = w[j+4];
        co30 = w[j+5];
        si11 = w[j+6];
        co11 = w[j+7];
        si21 = w[j+8];
        co21 = w[j+9];
        si31 = w[j+10];
        co31 = w[j+11];
        j += 12;
        xh0 = x[0] + x[l1];
        xh1 = x[1] + x[l1+1];
        xh0_1 = x[2] + x[l1+2];
        xh1_1 = x[3] + x[l1+3];
        xl0 = x[0] - x[l1];
        xl1 = x[1] - x[l1+1];
        xl0_1 = x[2] - x[l1+2];
        xl1_1 = x[3] - x[l1+3];
        xh20 = x[h2] + x[l2];
        xh21 = x[h2+1] + x[l2+1];
        xh20_1 = x[h2+2] + x[l2+2];
        xh21_1 = x[h2+3] + x[l2+3];
        xl20 = x[h2] - x[l2];
        xl21 = x[h2+1] - x[l2+1];
        xl20_1 = x[h2+2] - x[l2+2];
        xl21_1 = x[h2+3] - x[l2+3];
        x0 = x;
        x0[0] = xh0 + xh20;
        x0[1] = xh1 + xh21;
        x0[2] = xh0_1 + xh20_1;
        x0[3] = xh1_1 + xh21_1;
        xt0 = xh0 - xh20; yt0 = xh1 - xh21;
        xt1 = xl0 + xl21; yt2 = xl1 + xl20;
        xt2 = xl0 - xl21; yt1 = xl1 - xl20;
        xt0_1 = xh0_1 - xh20_1; yt0_1 = xh1_1 - xh21_1;
        xt1_1 = xl0_1 + xl21_1; yt2_1 = xl1_1 + xl20_1;
        xt2_1 = xl0_1 - xl21_1; yt1_1 = xl1_1 - xl20_1;
        x2 = x;
        x2[l1] = (si20*yt0 + co20*xt0)>>15;
        x2[l1+1] = (co20*yt0 - si20*xt0)>>15;
        x2[l1+2] = (si21*yt0_1 + co21*xt0_1)>>15;
        x2[l1+3] = (co21*yt0_1 - si21*xt0_1)>>15;
        x2[h2] = (si10*yt1 + co10*xt1)>>15;
        x2[h2+1] = (co10*yt1 - si10*xt1)>>15;
        x2[h2+2] = (si11*yt1_1 + co11*xt1_1)>>15;
        x2[h2+3] = (co11*yt1_1 - si11*xt1_1)>>15;
        x2[l2] = (si30*yt2 + co30*xt2)>>15;
        x2[l2+1] = (co30*yt2 - si30*xt2)>>15;
        x2[l2+2] = (si31*yt2_1 + co31*xt2_1)>>15;
        x2[l2+3] = (co31*yt2_1 - si31*xt2_1)>>15;
        x += 4;
        predj = (j - fft_jmp);
        if(!predj) x += fft_jmp;
        if(!predj) j = 0;
    }
    tw_offset += fft_jmp;
    stride = stride>>2;
} // end of while
// last stage, with stride = 4
    x = ptr_x;
    x2 = x;
    w = ptr_x + tw_offset;
    for(i = 0; i < n>>1; i += 2) {
        xh0 = x[0] + x[4];
        xh1 = x[1] + x[5];
        xh20 = x[2] + x[6];
        xh21 = x[3] + x[7];
        xl0 = x[0] - x[4];
        xl1 = x[1] - x[5];
        xl20 = x[2] - x[6];
        xl21 = x[3] - x[7];
        x += 8;
        x2[0] = xh0 + xh20;
        x2[1] = xh1 + xh21;
        x2[2] = (xl0 + xl21)>>1;
        x2[3] = (xl1 - xl20)>>1;
        x2[4] = (xh0 - xh20)>>1;
        x2[5] = (xh1 - xh21)>>1;
        x2[6] = (xl0 - xl21)>>1;
        x2[7] = (xl1 + xl20)>>1;
        x2 += 8;
    }
}
```

Modifications

The preferred embodiments can be varied in many ways while retaining the feature of an FFT with sequential memory location butterfly computations. For example, a radix other than 2 or 4 could be used, the number of stages could be larger (e.g., a 4096-point FFT with radix equal to 4 would have six stages), the precision of the data could be varied, the butterfly can employ saturation and/or rounding to improve precision and stability.

What is claimed is:

1. A fast Fourier transform method, comprising the steps of:

(a) storing data in sequence in memory;
(b) partitioning a fast Fourier transform into three or more stages;

(c) within each of said stages ordering the butterfly computations to correspond to said sequence; and (d) providing a redundant twiddle factor table including a first set of twiddle factors plus a second set of twiddle factors wherein said second set is a subset of said first set.

2. A fast Fourier transform method, comprising the steps of:

(a) providing N-point data where N is a positive integer;

(b) computing radix-R butterflies in a block of N/R overlapping butterflies of said data where R is a positive integer;

(c) computing radix-R butterflies in a first block of $N/R^2$ overlapping butterflies of the results of step (a); and (d) after step (c) computing radix-R butterflies in a second block of $N/R^2$ overlapping butterflies of the results of step (a); and (e) providing a redundant twiddle factor table including a first set of twiddle factors plus a second set of twiddle factors wherein said second set is a subset of said first set.

3. The method of claim 2, wherein:

(a) R equals 2.

4. The method of claim 2, wherein:

(a) R equals 4.

* * * * *